United States Patent [19]

Huang et al.

[11] Patent Number: 5,398,069
[45] Date of Patent: Mar. 14, 1995

[54] ADAPTIVE MULTI-STAGE VECTOR QUANTIZATION

[75] Inventors: Chien M. Huang, Logan; Paul D. Israelsen, North Logan, both of Utah

[73] Assignee: Scientific Atlanta, Atlanta, Ga.

[21] Appl. No.: 38,157

[22] Filed: Mar. 26, 1993

[51] Int. Cl.$^6$ ............................................. H04N 7/130
[52] U.S. Cl. .................................. 348/422; 348/405; 348/418
[58] Field of Search ....................... 358/133, 136, 141; H04N 7/130; 348/405, 418, 422

[56] References Cited

U.S. PATENT DOCUMENTS

| | | | |
|---|---|---|---|
| 4,853,779 | 8/1989 | Hammer et al. | 358/133 |
| 5,031,037 | 7/1991 | Israelsen | 358/133 |
| 5,111,292 | 5/1992 | Kuriacose et al. | 358/133 |
| 5,136,377 | 8/1992 | Johnston et al. | 358/136 |
| 5,144,423 | 9/1992 | Knauer et al. | 358/133 |
| 5,172,228 | 12/1992 | Israelsen | 358/133 |
| 5,231,485 | 7/1993 | Israelsen et al. | 358/136 |

OTHER PUBLICATIONS

Yo-Sung Ho and Allen Gersho, "Variable-Rate Multi-Stage Vector Quantization for Image Coding", IEEE pub. no. CH2561-9 88 0000-1156, pp. 1156-1159 (1988).

Biing-Hwang Juang, A. H. Gray, Jr., "Multiple Stage Vector Quantization for Speech Coding", IEEE pub. no. CH1746-7/82/0000-0597, pp. 597-600 (1982).

Primary Examiner—Tommy P. Chin
Assistant Examiner—Richard Lee
Attorney, Agent, or Firm—Woodcock Washburn Kurtz Mackiewicz & Norris

[57] ABSTRACT

Vector quantization of a data vector proceeds through successive stages of a multi-stage vector quantization encoder until either (i) a measure of distortion between the vector input to a given stage and the codevector selected at that stage satisfies a threshold value or (ii) the last stage of the encoder is reached. The threshold value varies according to the fullness of a buffer which stores vector quantized data to be transmitted. Consequently, the last stage reached may differ from data vector to data vector. Compression efficiency therefore improves. Preferably, the mean value of each data vector is removed prior to vector quantization.

40 Claims, 8 Drawing Sheets

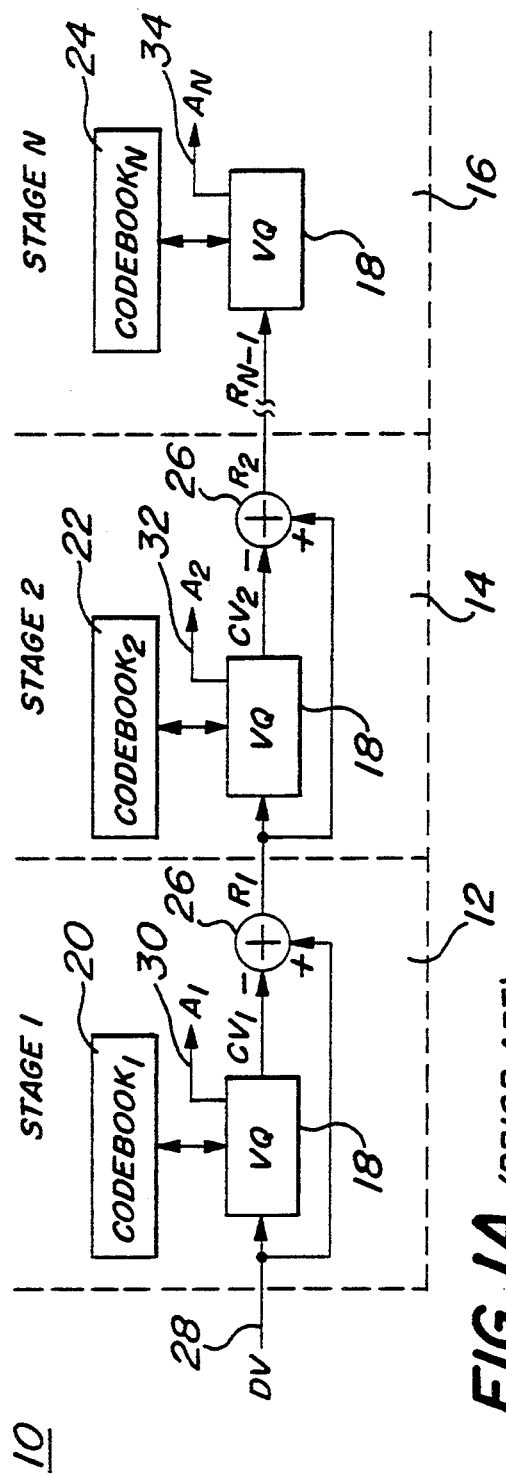
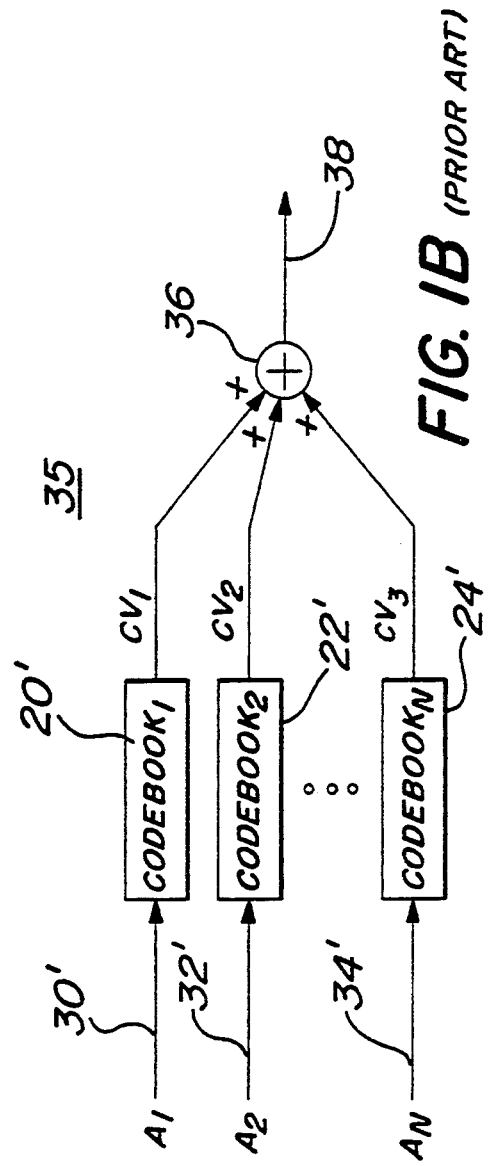
FIG. 1A (PRIOR ART)
FIG. 1B (PRIOR ART)

ADAPTIVE MULTI-STAGE VECTOR QUANTIZATION

BACKGROUND OF THE INVENTION

1. Field of the Invention

The present invention relates generally to a data compression method and apparatus, and more particularly, the present invention relates to methods and apparatus for compressing data by an adaptive multi-stage vector quantization technique.

2. Description of the Prior Art

Data compression using vector quantization ("VQ") has received great attention in the last decade because of its promising compression ratio and relatively simple structure. In its simplest implementation, VQ requires transforming data to be compressed into data vectors. For example, an image frame comprising a plurality of pixels may be sub-divided into smaller blocks of pixels, and each block may be transformed into a multi-dimensional data vector. In order to compress the data, each data vector is compared to the entries of a "codebook" containing representative "codevectors." The codevector that most closely resembles the original data vector is then selected and the codebook "address" of that codevector is then transmitted to a receiver. At the receiver, the transmitted address is used to fetch the same codevector from an identical codebook at the receiver, thus reconstructing an approximation to the original data vector. Compression is achieved because, on average, the codebook address of a codevector requires far fewer bits than transmitting the codevector itself.

Before vector quantization can be performed, a codebook of representative codevectors must be constructed. Essentially, codebooks are constructed using a sequence of "training" vectors in accordance with a codebook generation algorithm, such as the well known Linde-Buzo-Gray (LBG) algorithm. See, Y. Linde, A. Buzo and R. M. Gray, "An Algorithm for Vector Quantizer Design," *IEEE Trans. Commun.*, vol. COM-28, pp. 84–95 (January, 1980). The performance of a vector quantizer is highly dependent upon the codebook. As one can appreciate, if the actual data vectors to be compressed by the quantizer are similar to the vectors in the "training" sequence, the reproduction quality at the receiver will be best. However, due to the large variety of possible data vectors that can arise in a given application, there may be situations where a close match for a given data vector cannot be found. In such cases, the reproduction quality will suffer.

One way to enhance the performance of a vector quantizer is to increase the size of the codebook so that the likelihood of finding a closely matching codevector for a given data vector is much greater. Unfortunately, a large codebook can require such a large memory that cost becomes prohibitive. In addition, the processing power and time needed to search a large codebook may be impractical. Several techniques have been explored for avoiding the problems that arise with large codebooks.

One very well known technique for reducing the search time with a large codebook is to employ a tree-search technique. The tree search technique is sometimes referred to as "tree-search vector quantization", "tree-search VQ" and "TSVQ." With the tree-search technique, the codebook structure resembles a tree in which codevectors reside at various nodes of the tree and the nodes are arranged in levels. Successive levels of the tree are formed by branches emanating from each node in a preceding level. Rather than comparing a data vector to every codevector in the codebook (i.e., a full-search technique), the search begins at the root node of the tree and traverses down through the levels of the tree along selected branches. Because only the codevectors along selected branches are examined, search time is greatly reduced. However, although TSVQ reduces search time, it generally does not guarantee that the best match for the data vector will be found. A detailed description of the tree search technique may be found in R. M. Gray and H. Abut, "Full Search and Tree Searched Vector Quantization of Speech Waveforms," *Proc. IEEE Int. Conf. Acoust, Speech, Signal Processing*, pp. 593–96 (May, 1982). A variation on the basic TSVQ technique, and a preferred method and apparatus for performing TSVQ, are disclosed in Israelsen, U.S. Pat. No. 5,172,228, entitled "Image Compression Method and Apparatus Employing Distortion Adaptive Tree search Vector Quantization," issued Dec. 15, 1992, and incorporated herein by reference.

Another solution to the problems that arise with large codebooks is to use a small, adaptive codebook which can automatically adapt to the changing characteristics of a group of data vectors. See, e.g., M. Golberg, P. R. Boucher and S. Shlien, "Image Compression Using Adaptive Vector Quantization," *IEEE Trans. Commun.*, vol. 34, no. 2, pp. 180–187 (February 1986). Essentially, the codebook is updated or rebuilt as the overall characteristics of the data vectors change. Of course, as the codebook in the compression apparatus changes, those changes must be transmitted to receiving locations so that the receiving locations can reproduce the original data vectors. Consequently, the overall data bandwidth is reduced. Additionally, adaptive codebooks significantly increase the complexity of vector quantizers.

Another technique for avoiding the need for large codebooks while maintaining a sufficient level of reproduction quality is know as "multi-stage vector quantization" or "MSVQ." See, e.g., B. H. Juang, and A. H. Gray, Jr., "Multiple Stage Vector Quantization for Speech Coding," *Proc. IEEE ICASSP*, pp. 597–600 (April, 1982). A multi-stage vector quantization encoder comprises a plurality of VQ stages arranged consecutively. Each stage has its own, relatively small codebook of representative codevectors. At the first stage, an original data vector is encoded by selecting a best match codevector from the codebook at that stage. A residual vector is then obtained by subtracting the selected codevector from the original data vector. At the next stage, the residual vector from the preceding stage is vector quantized, and so on. Each successive stage encodes the residual vector from the previous stage. As the process proceeds through each successive stage, the quantized approximation to the original data vector successively improves.

MSVQ significantly reduces memory requirements. With MSVQ, the amount of memory needed to store the codevectors of each stage is proportional to the number of stages, whereas, in a conventional TSVQ encoder using a single large codebook, the amount of memory needed is exponentially proportional to the codebook address size. For example, a multi-stage vector quantization encoder with six (6) stages that each employ a codebook of $2^4$ codevectors requires a storage capacity of 96 codevectors (6 stages $\times 2^4$ codevectors/stage). With a tree-search vector quantizer, however, a single codebook containing approximately $2^{24}$ ($\approx 16$ million) codevectors is required in order to achieve a similar degree of encoding accuracy. As can be seen from the foregoing illustration, the MSVQ technique is extremely advantageous from a memory standpoint.

Although MSVQ avoids many of the problems that arise with excessively large codebooks, performance rapidly diminishes as the number of stages increases. Also, it is not always necessary to proceed through every stage of a multi-stage vector quantization encoder. For example, a data vector may be sufficiently encoded after only a few stages, and further encoding at subsequent stages may not create a visually perceptible increase in reproduction quality at a decoder. An article by Y. Ho and A. Gersho, entitled "Variable-Rate Multistage Vector Quantization for Image Coding," presented at the 1989 International Conference on Acoustics, Speech, and Signal Processing (ICASSP), describes a multi-stage encoder in which thresholds are employed to selectively encode the residual image data at the last two stages of a five stage encoder. According to Ho and Gersho, when the fourth stage of the encoder is reached, the residual vector at that stage is vector quantized only if the squared sum of residual errors remaining at that stage exceeds a first threshold value. If the threshold is satisfied, then no encoding occurs at that stage, and the residual is simply passed to the fifth or last stage. At the last stage, the error remaining is compared to a second, smaller threshold value. Again, if the threshold value is satisfied, the residual vector is not encoded at the last stage. Encoding at the last stage occurs only if the threshold value is exceeded. According to the technique of Ho and Gersho, therefore, the encoding process always proceeds through to the last stage of the encoder, but encoding may not take place at either one of the last two stages. While the technique described by Ho and Gersho may result in some increase in encoding efficiency, the method is disadvantageous for at least four reasons. First, vector quantization is always performed at the first three stages, even though the increased encoding accuracy provided at each successive stage may not be visibly perceptible at a decoder. Second, even when the threshold value is satisfied in the fourth stage, encoding may still be performed at the last stage. Thus, some form of processing occurs at every stage of the encoder despite the use of threshold values in the fourth and fifth stages. Third, although Ho and Gersho mention that different threshold values can be used to alter the trade-off between bit-rate and encoding accuracy, the threshold values for a given application are pre-determined and remain fixed during vector processing. Finally, although Ho and Gersho recognize that their multi-stage vector quantization encoder will produce data at a variable rate, they fail to address the need for maintaining a fixed rate data stream over a communications channel. Variable rate transmission is often impractical because most transmission mediums are susceptible to noise. As the foregoing illustrates, therefore, a more advantageous solution to the problems inherent in most prior art multi-stage vector quantization encoders is needed. The present invention satisfies this need.

SUMMARY OF THE INVENTION

The present invention relates to methods and apparatus for compressing data according to an adaptive multi-stage vector quantization technique. A multi-stage vector quantization encoder typically comprises a plurality of consecutive vector quantization stages wherein each stage comprises a vector quantizer and an associated codebook containing a plurality of codevectors. A unique address is associated with each codevector in the codebook of each stage. In the prior art, vector quantization of a data vector typically proceeds through to the last stage of a multi-stage encoder. According to the present invention, however, vector quantization proceeds through successive stages until either (i) a measure of quantization error at a given stage satisfies a threshold value or (ii) the last stage of the encoder is reached. The last stage reached during compression of a particular data vector may differ from the last stage reached for other vectors. Because quantization proceeds to subsequent stages only when necessary, compression efficiency is increased.

According to the method of the present invention, a data vector indicative of a block of data to be compressed is received and provided to an initial stage of a multi-stage encoder. At the initial stage, a codevector is selected from the codebook at that stage that most closely resembles the data vector. A residual vector is then generated by subtracting the selected codevector from the data vector. A measure of the quantization error at the initial stage is then obtained, and if the measure of quantization error satisfies a threshold value, then quantization of the current data vector is completed and the address of the codevector selected at the initial stage may be transmitted to a remote location.

If, however, the quantization error at the initial stage exceeds the threshold value, then the residual vector generated at that initial stage is passed to the next stage. This next stage becomes the a current stage. A codevector is then selected from the codebook at this current stage that most closely resembles the residual vector from the immediately preceding stage, i.e., the initial stage. A residual vector is then generated for the current stage by subtracting the selected codevector from the previous stage's residual vector. A measure of the quantization error for the current stage is then determined and, if the quantization error exceeds the threshold value, then the residual vector generated at the current stage is passed to the next succeeding stage.

The process continues in this manner through each successive stage until either (i) a measure of quantization error at a particular stage satisfies the threshold value, or (ii) a last stage of the multi-stage encoder has been reached. Once the threshold has been satisfied at a particular stage, the addresses of each codevector selected at that stage and all preceding stages are transmitted to a remote location. Another data vector may then be compressed in the same manner.

Preferably, the codevector addresses are transmitted at a fixed data rate, and the method further comprises the steps of storing addresses to be transmitted in a buffer, periodically obtaining a measure of unused capacity of the buffer, and automatically adjusting the threshold value based upon the measure of unused buffer capacity. A mean-removed vector quantization technique ("MRVQ") may further be combined with the adaptive multi-stage vector quantization method of the present invention.

According to another aspect of the present invention, a data header is constructed that specifies the number of codevector addresses being transmitted for a particular data vector. The data header is transmitted along with the codevector addresses to facilitate decompression at a remote location.

At the remote location, the codebooks of each stage of the multi-stage encoder are reproduced. Each address transmitted by the encoder is received at the remote location, and the codevector associated with each received address is retrieved from a respective one of the reproduced codebooks. The retrieved codevectors are then summed to obtain a substantial reproduction of the data vector.

An adaptive multi-stage vector quantization encoder according to the present invention comprises a plurality N of vector quantization stages arranged consecutively, each having a vector input, a residual vector output and a codevector address output. The residual vector output of each stage is coupled to the vector input of a succeeding stage. The vector input of an initial stage is coupled to receive a data vector indicative of a block of data to be compressed.

Each stage comprises a vector quantizer having an associated codebook containing a plurality of codevectors. Each codevector in the codebook at each stage has an address associated therewith. The vector quantizer at each stage performs vector quantization on an input vector to that stage. For the initial stage, the input vector comprises the original data vector. For each succeeding stage, the input vector comprises the residual vector from the immediately preceding stage. Each stage further comprises a vector subtractor coupled to the vector quantizer for generating a residual vector by subtracting a codevector selected by the quantizer from the input vector to that stage. A distortion calculator is provided for determining a measure of distortion between the input vector and the selected codevector. This measure of distortion represents the quantization error that occurred at the particular stage. A comparator compares the measure of distortion to a threshold value. Finally, a gating device is provided that is responsive to the comparator for allowing the residual vector to pass from the residual vector output of the stage to the vector input of a next succeeding stage only when the measure of distortion exceeds the threshold value.

The multi-stage vector quantization encoder of the present invention further comprises a transmitter for transmitting the addresses of codevectors selected at each stage to a remote location. In a preferred embodiment, a data buffer temporarily stores the addresses of selected codevectors prior to transmission, and addresses are transmitted from the buffer at a fixed data rate. A threshold calculator may be coupled to the buffer and to each stage for providing each stage with the threshold value and for periodically adjusting the threshold value based upon a measure of the un-used capacity of the buffer. Means for performing mean-removal may also be provided. A data combiner may be provided for generating a data header that identifies, for a particular data vector, which stage was the last stage reached during compression of that data vector. The data header is transmitted along with the codevector addresses and may be employed at the remote location to determine the number of codevector addresses transmitted for that data vector.

A vector quantization decoder for use at a remote location in accordance with the present invention comprises a plurality of codevector codebooks, each identical to the codebook at a respective one of the stages of the multi-stage encoder. The decoder further comprises a receiver for receiving each of the codevector addresses transmitted by the encoder for a particular data vector. Each received codevector address is employed to retrieve the codevector associated with that address from a respective one of the codebooks. An adder then sums the retrieved codevectors to obtain a substantial reproduction of the data vector. When the encoder is operative to transmit a data header with the codevector address, the vector quantization decoder may further comprise a header decoder for receiving and processing the data header to determine the number of codevector addresses to be received for the data vector.

Further details and features of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 1A shows a block diagram of a prior art multi-stage vector quantization encoder;

FIG. 1B shows a block diagram of a prior art multi-stage vector quantization decoder;

DETAILED DESCRIPTION OF THE PREFERRED EMBODIMENTS

Figure 2:
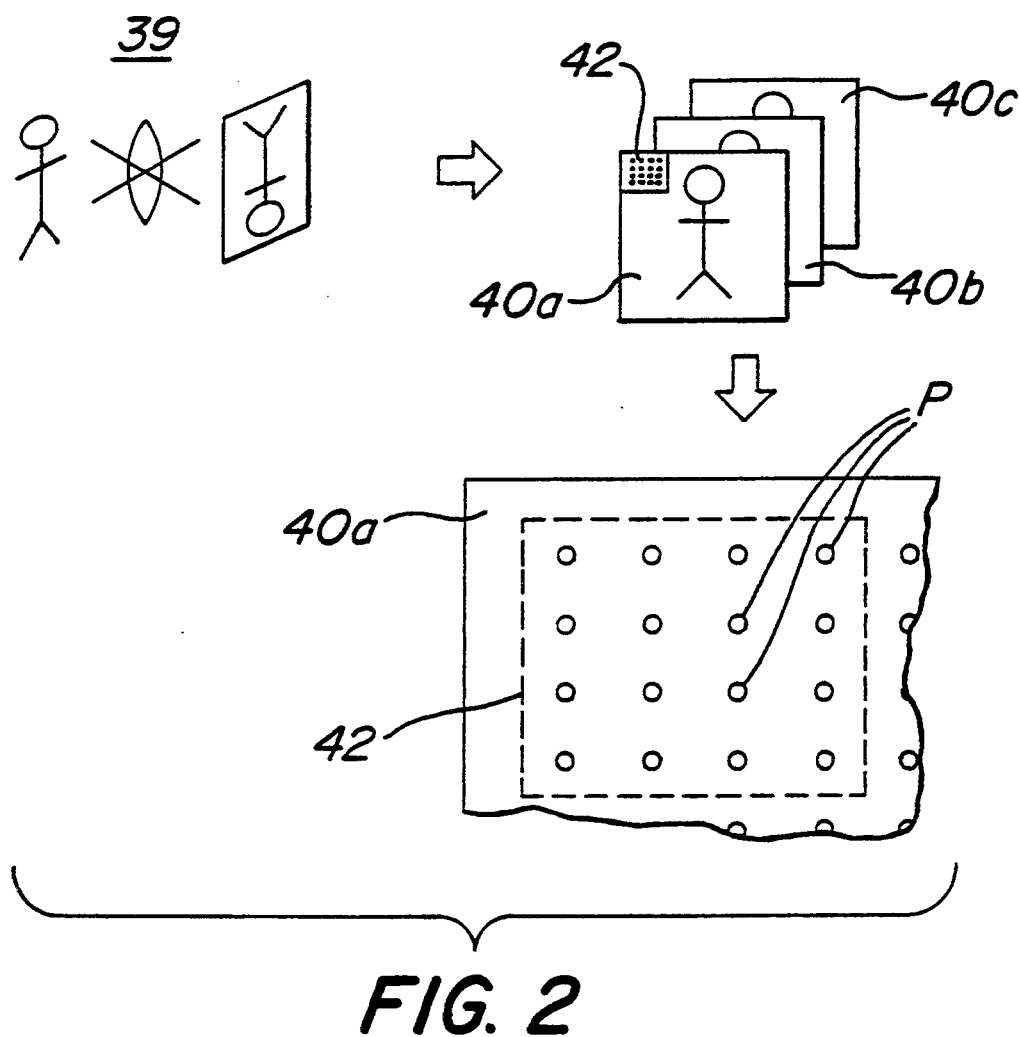
FIG. 2 illustrates the concept of converting a block of pixels from a digital image frame into a data vector for vector quantization.

Referring to the drawings wherein like numerals indicate like elements throughout, there is shown in FIG. 1A a block diagram of a prior art multi-stage vector quantization encoder 10. As shown, the prior an encoder 10 comprises a plurality N of VQ stages 12, 14 ... 16 consecutively arranged such that, except for the first stage 12, the input of each successive stage is coupled to the output of the preceding stage. Except for the last stage 16, each successive stage 12, 14 comprises a vector quantizer 18, a codebook of codevectors, e.g.

codebooks 20, 22 respectively, and a vector subtractor 26. The last stage comprises only a vector quantizer 18 and a codebook 24.

In operation, the prior art multi-stage encoder 10 receives a data vector (DV) to be compressed at an input 28. As shown, the data vector passes directly to the vector quantizer 18. Vector quantizer 18 performs vector quantization on the data vector by comparing the data vector to the codevectors stored in codebook 20 and selecting the codevector from codebook 20 that most closely resembles the data vector. The selected codevector is then provided to one input of vector subtractor 26. The address of the selected codevector is output on line 30 for transmission to a remote VQ decoder (e.g., decoder 35 of FIG. 1B). Compression is achieved because the address of the selected codevector requires significantly less bits to transmit than the codevector itself.

As shown, the vector subtractor 26 of the first stage 12 receives the original data vector at its other input. Subtractor 26 then subtracts the selected codevector from the original data vector, on an element-by-element basis, to produce a residual vector (R1) that represents the quantization error that occurred in the first stage. As shown, the residual vector R1 from the first stage is passed to the vector quantizer 18 of the second stage 14. Vector quantizer 18 at the second stage 14 performs vector quantization on the residual vector received from the previous stage 12. Whereas the codebook 20 of the first stage contains codevectors representative of possible data vectors that may be input on line 28, the codebook 22 at the second stage contains codevectors representative of possible residual vectors produced by the first stage 12. Essentially, the second stage 18 quantizes the encoding error (i.e., residual vector R1) from the previous stage. Upon selecting a codevector from the codebook 22, the vector quantizer 18 of the second stage 14 provides the address of the selected codevector on line 32 for transmission to the remote location. The selected codevector itself is provided to the vector subtractor 26 of the second stage 14.

In a manner similar to the subtractor 26 of the first stage 12, the subtractor 26 of the second stage 14 subtracts the selected codevector from residual vector R1 to generate a second residual vector R2. As can be appreciated, the second residual vector R2 represents the quantization error that occurred at the second stage 14. Residual vector R2 is then passed to the next stage, and the process continues through each subsequent stage. Thus, each stage performs vector quantization on the residual vector generated in the previous stage. At the last stage 16, vector quantization is performed on the residual vector from the preceding stage (i.e., stage $N-1$). A residual vector is not generated, however. Rather, the vector quantizer 18 at the last stage 16 simply provides the address of the codevector selected from codebook 24 on line 34 for transmission to the remote decoder. Each additional stage improves quantization accuracy by reducing the quantization error generated in the preceding stage. As one can appreciate, the greater the number of stages, the greater the encoding accuracy.

FIG. 1B is a block diagram of a prior art vector quantization decoder 35 for use with the encoder 10 of FIG. 1A. As shown, the decoder 35 comprises a plurality N of codebooks 20', 22', 24'. Each codebook 20', 22', 24' is identical to its respective codebook 20, 22, 24 in the encoder 10. Decoder 35 receives the addresses $A_1 \ldots$ $A_N$ transmitted by each of the N stages 12, 14 ... 16 of the encoder 10 and provides each received address to a respective codebook 20', 22' ... 24' so that the codevectors selected at each stage in the encoder can be reproduced at the decoder. For example, decoder 35 receives address $A_1$ on line 30' and provides that address to codebook 20' which is identical to codebook 20 in the first stage 12 of the encoder 10 (FIG. 1A). As a result, codevector CV1 selected in the first stage 12 of the encoder 10 is retrieved from the identical codebook 20' in the decoder 35. The codevectors selected at each other stage of the encoder 10 are retrieved in a similar manner from their respective codebooks, e.g. 22', 24'. Codevector CV1 represents the quantization of the original data vector, and each subsequent codevector CV2 ... CVN represents the quantization error resulting from the previous stage. Consequently, a very close approximation to the original data vector can be obtained by summing the codevectors selected at each stage (i.e., CV1, CV2 ... CVN). As shown in FIG. 1B, therefore, the codevectors retrieved from the codebooks 20', 22', 24' are provided to a vector summer 36 that sums each vector, on an element-by-element basis, and provides the result on line 38. As explained, the resulting vector provided on line 38 will be a close approximation to the original data vector.

Multi-stage vector quantization is advantageous because it achieves a high degree of encoding accuracy without requiring an extremely large codebook. Because each successive stage of the encoder 10 of FIG. 1A encodes only the error generated by the previous stage, each of the codebooks 20, 22, 24 may contain a relatively small number of codevectors. Consequently, the total number of codevectors required by the encoder 10 is significantly less than the number of codevectors that would be needed to obtain the same level of encoding accuracy with a single codebook.

A data vector to be compressed may represent any number of actual data types. For example, a data vector may represent a portion of a digital image frame or a portion of a digitized speech waveform. FIG. 2 illustrates the concept of converting a portion of an image frame into a data vector to be vector quantized. The concept illustrated in FIG. 2 is well known. See, for example, R. L. Baker, "Vector Quantization of Digital Images", Ph.D. Dissertation, Stanford University, Department of Electrical Engineering (1984); Gray, R. M., "Vector Quantization", *IEEE ASSP Mag.*, Vol. 1, pp. 4,29 (April 1984); Goldberg, M., Boucher, P. R. and Shlien, S., "Image Compression Using Adaptive Vector Quantization", *IEEE Comm.*, Vol. COM-34 No. 2 (February 1986); and, Nasrabadi, N. M. and King, R. A., "Image Coding Using Vector Quantization; A Review", *IEEE Comm.*, Vol. 36, No. 8 (August 1988). As is common in the art of digital imaging, temporally spaced image frames 40a, 40b, 40c, etc. are generated from a moving image 39. Each image frame 40 is defined by a matrix of pixels P. For example, a single image frame may comprise a 640×480 pixel matrix. In the case of a black and white image, each pixel P reports an intensity value, whereas in the case of a color image, each pixel may report luminance and chrominance values, or other values indicative of a color associated with the pixel.

When an entire image frame is to be compressed, the pixels P of an image frame, e.g. frame 40a, are grouped into blocks that define sub-matrices of the image frame. Each of these sub-matrices defines a single data vector.

For example, the block of pixels 42 of image frame 40a defines one data vector for image frame 40a. A plurality of successive data vectors will be needed to represent the entire image frame 40a, i.e., one data vector per block or sub-matrix. Image data vectors are typically two-dimensional. In the example shown, data vector 42 will be a 4×4pixel vector. However, any size vector may be employed in accordance with the present invention. For example, 6×6 vectors may be employed, or alternatively, 4×3 vectors may be employed. Although two-dimensional vectors are typical with image data, there may be instances where image data vectors are uni-dimensional, for example, when data vectors are constructed from only single rows or columns of pixels. Also, image data vectors may have more than two dimensions, for example, where data in addition to pixel intensity (e.g., color data) is included in each vector. Other types of data, such as speech waveform data, may produce multi-dimensional vectors as well. It is important to understand that the present invention may be employed to compress any type of data vector no matter what the size or dimension.

Figure 3:
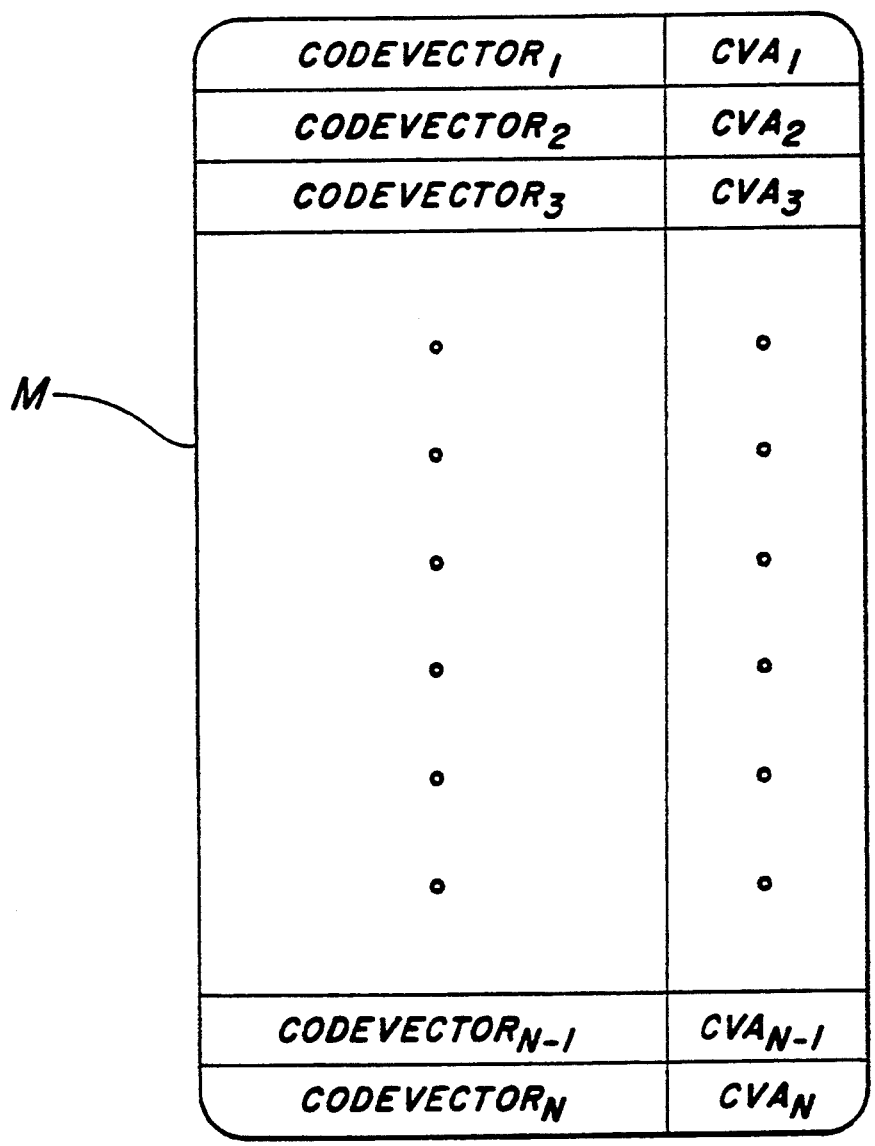
FIG. 3 illustrates an exemplary memory for storing a codebook.

FIG. 3 illustrates an exemplary codebook memory M for storing codevectors. Codevectors typically are stored in unique memory locations within the memory M. As shown, each codevector has a unique memory address (e.g., CVA1, CVA2 . . . CVAN) associated with it. Each address is generally much smaller (in bits) than its associated codevector. For example, each codevector in a 64 codevector codebook may comprise as many as 128 bits, whereas only 6 bits are needed to address each codevector.

As mentioned previously, codebooks are typically generated from a sequence of training vectors according to a codebook generation algorithm, such as the well known Linde-Buzo-Gray (LBG) algorithm. With a multi-stage vector quantizer, an original training set is used to generate the codebook for the initial stage. For each subsequent stage, however, a training set composed of residual vectors from the previous training set is used. For example, after generating a codebook for the initial stage, each of the vectors in the original training set is vector quantized using that codebook, and a residual vector is obtained for each original training vector. The resultant set of residual vectors defines the training set for the next stage, and so on. Applicants have found that codebook generation complexity is much less when generating codebooks for a multi-stage vector quantizer than when generating a single large codebook.

Figure 4:
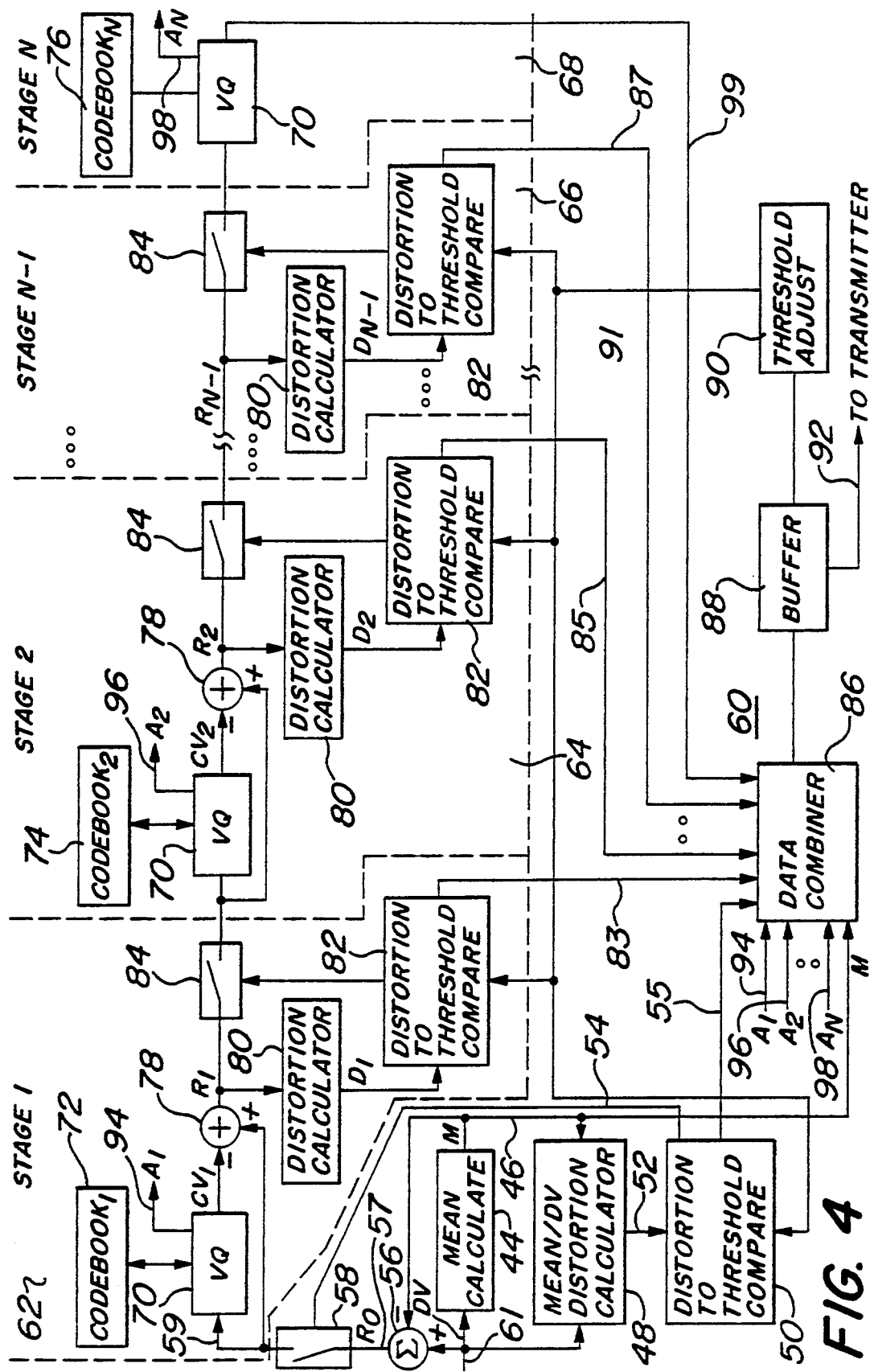
FIG. 4 is a block diagram of a preferred embodiment of an adaptive multi-stage vector quantization encoder in accordance with the present invention.

FIG. 4 is a block diagram of a preferred embodiment of an adaptive multi-stage vector quantization encoder 60 in accordance with the present invention. As mentioned above, with prior art multi-stage VQ encoders, processing typically (but not always) continues through to the last stage of the encoder. According to the present invention, however, whether processing continues to a next stage depends on a comparison between a threshold value and the quantization error resulting at a current stage. As shown in FIG. 4, in the present embodiment, the encoder 60 comprises a plurality N of VQ stages 62, 64 . . . 66, 68 consecutively arranged such that, except for the first stage, the input of each successive stage is coupled to the output of the preceding stage. Except for the last stage 68, each successive stage 62, 64 . . . 66 comprises a vector quantizer 70, a codebook of codevectors, e.g. codebooks 72 and 74, and a vector subtractor 78.

Encoder 60 further comprises a mean value calculator 44, a distortion calculator 48 and a comparator 50. A data vector (DV) to be compressed is received at an input 61 and provided to calculator 44 which computes the mean value of the data vector. A vector mean is generally calculated by summing the individual vector elements and dividing by the total number of elements. The mean value is supplied on line 46 to the "−" input of a vector subtractor 56 that also receives, at a "+" input, the data vector itself. The mean value is also provided to a data combiner 86. Subtractor 56 subtracts the mean value from each sample (e.g., pixel) in the data vector to generate, on line 57, a mean-removed vector $R_o$. As shown, the mean-removed vector $R_o$ is supplied via line 57 to a gating device 58 which prevents the mean-removed vector $R_o$ from passing to the input 59 of the initial VQ stage 62 of the encoder 60.

As further shown, the data vector and its mean value are provided to the distortion calculator 48 which calculates a measure of distortion between the mean value and the data vector. Any measure of distortion will suffice. For example, calculator 48 may subtract the mean value from each sample (e.g. pixel) in the data vector and then add the differences. Alternatively, the measure of distortion may be obtained by squaring each of those differences and then summing the squares. Once calculated, the distortion is supplied to comparator 50 via line 52. Comparator 50 compares the measure of distortion to a threshold value provided by threshold adjust circuitry 90 via line 91. Operation of the threshold adjust circuitry 90 will be provided hereinafter.

If the measure of distortion between the mean value and the data vector is less than the threshold value, then vector quantization will not be performed for that data vector. Rather, a signal is provided via line 55 to the data combiner 86 indicating that the mean value itself is an adequate representation of the data vector. In response, the data combiner 86 forms a data header that indicates that only the mean value will be transmitted for this data vector. Combiner 86 then inserts the data header and mean value, in that order, into a buffer 88 for subsequent transmission to a remote vector quantization decoder.

If, however, the measure of distortion between the mean value and the data vector exceeds the threshold value, then vector quantization must be performed for the current data vector. Accordingly, a signal is provided by the comparator 50 via line 54 to the gating device 58 which, in response, allows the mean-removed vector $R_o$ to pass to the input 59 of the initial stage 62 of the encoder 60. As shown, therefore, vector quantization is actually carried out on the mean-removed vector rather than the data vector itself. The technique of mean removal prior to vector quantization, known generally as "mean removed vector quantization" (MRVQ), has numerous advantages. See, for example, the aforementioned article by R. M. Gray entitled "Vector Quantization" and the aforementioned Ph.D. dissertation by R. L. Baker entitled "Vector Quantization of Digital Images". Although the invention is described herein as employing MRVQ, this is simply the preferred embodiment, and the invention is not limited to use of MRVQ, except as may be expressly set forth in the accompanying claims. Rather, if desired, the data vector itself, or some other variant thereof, may be input to the initial stage 62.

At each stage, 62 . . . 68 the vector quantizer 70 performs vector quantization on a vector input to that stage (i.e., an input vector) by selecting a codevector from the codebook at that stage that most closely resembles the input vector. Each vector quantizer 70 provides the address of the codevector selected at that stage on a respective line 94 . . . 98. Except for the last stage 68, the subtractor 78 at each stage subtracts the codevector selected at that stage from the input vector at that stage to generate a residual vector. The residual vector generated at a given stage represents the quantization error for that stage. As mentioned, the residual vector generated at a given stage defines the input vector for the next stage.

As described hereinafter in greater detail, each stage further comprises a distortion calculator 80 for obtaining a measure of distortion between the vector input to that stage and a codevector selected at that stage, a comparator 82 for comparing that measure of distortion to the threshold value, and a gating device 84 coupled to the comparator and to the subtractor 78 for selectively passing a residual vector to the next stage. As shown, the last stage 68 comprises only a vector quantizer 70 and a codebook 76.

Encoder 60 further comprises a data combiner 86 for receiving codevector addresses provided by each stage 62 . . . 68 via lines 94 . . . 98, respectively. Recall from above that, in the preferred embodiment, data combiner 86 also receives the mean value of each data vector received at input 61 for compression. Data combiner 86 is further coupled to the comparators 82 at each stage. As explained hereinafter in greater detail, in response to a signal provided by the last stage reached during compression of a given data vector, the data combiner 86 forms a data header indicating that last stage reached. A data buffer 88 is coupled to the data combiner 86 for receiving the codevector address data and data header generated for each data vector compressed by the encoder. A threshold adjust circuit 90 is coupled to buffer 88 for generating a threshold value based on a measure of the un-used capacity of the buffer 88. Details of the operation of the threshold adjust circuit 90 are provided hereinafter in greater detail. As shown, data in the buffer 88 is serially transmitted from the buffer 88 via line 92. Preferably, data is transmitted from the buffer 88 at a fixed data rate (i.e., constant bps).

In operation, the vector quantization encoder 60 of the present invention receives a data vector for compression at an input 61. As described above, the mean value of the data vector is calculated and provided to the data combiner 86. Also, subtractor 56 removes the mean value from the data vector to generate a mean-removed vector $R_o$ which is provided on line 57 to gating device 58. Calculator 48 determines a measure of distortion between the data vector and its mean value and provides the measure of distortion to comparator 50. If the measure of distortion is less than the threshold value, then only the mean value is transmitted for that data vector. If, however, the measure of distortion exceeds the threshold, then comparator 50 provides a signal to gating device 58 which, in response, allows the mean-removed vector $R_o$ to pass to the input 59 of the initial stage 62 of encoder 60. Thus, the mean-removed vector $R_o$ defines an input vector to the first (i.e., initial) stage 62.

As shown, the input vector (i.e., the mean-removed vector at this stage) passes directly to the vector quantizer 70 of the first stage 62. Vector quantizer 70 performs vector quantization on the input vector (i.e., the mean-removed vector) by comparing the input vector to the codevectors stored in codebook 72 and selecting the codevector from codebook 72 that most closely resembles the input vector. The selected codevector is then provided to one input of the vector subtractor 78 of the first stage 62. The address of the selected codevector is output on line 94 and provided to the data combiner 86 for subsequent insertion into the buffer 88.

As shown, the vector subtractor 78 of the first stage 62 receives the input vector at its other input. Subtractor 78 then subtracts the selected codevector from the input vector, on an element-by-element basis, to produce a residual vector (R1) that represents the quantization error that occurred in the first stage 62. As shown, residual vector R1 is provided to the gating device 84 which prevents the residual vector R1 from passing to the next stage 64.

Using the residual vector R1 provided by subtractor 78, the distortion calculator 80 of the first stage 62 determines a measure of distortion between the input vector (i.e., the mean removed vector $R_o$) to the first stage and the codevector selected by quantizer 70. In the present embodiment, the measure of distortion, D, for a given stage is defined as:

$$D = \|R\| = \left(\sum_{i=1}^{k} |r_i^\alpha|\right)^{1/\alpha},$$

where $\|R\|$ is the residual vector norm, $R=(r_1, r_2, \ldots, r_k)$ and where $r_i$ is the ith residual vector element, k is the vector dimension and $\alpha$ is an integer. However, any suitable measure of distortion between the input vector and the selected codevector may be employed without deviating from the scope of the present invention as defined by the appended claims.

After determining a measure of distortion, D1, the calculator 80 of the first stage 62 provides the measure of distortion D1 to the comparator 82. Comparator 82 compares the distortion D1 to the threshold value provided by threshold adjust circuitry 90 via line 91. If the distortion D1 does not exceed the threshold value, then the comparator 82 provides a signal via line 83 to the data combiner 86 indicating that the current stage (i.e., the first stage) is the last stage reached for the current data vector being processed. Gating device 84 will not allow the residual vector R1 to pass to the next stage.

If, however, the distortion D1 exceeds the threshold value, then comparator 82 does not signal the data combiner 86. Rather, comparator 82 provides a signal to the gating device 84 which, in response, allows the residual vector (R1) generated at the first stage 62 to pass to the second stage 64. As shown, the residual vector R1 generated in the first stage 60 will pass directly to the input of the vector quantizer 70 of the second stage 64 and will also be provided to one input of the subtractor 78 of the second stage 62. Residual vector R1 therefore defines an input vector to the second stage 64. The vector quantizer 70 of the second stage 64 performs vector quantization on the input vector to that stage, i.e., the residual vector from the previous stage 62. As explained above, whereas the codebook 72 of the first stage 62 contains codevectors representative of possible mean-removed vectors that may be input to the first stage 62 on line 59, the codebook 74 at the second stage 64 contains codevectors representative of possible residual vectors produced by the first stage 62. Essentially, therefore, the second stage 64 quantizes the encoding error from the previous stage.

Upon selecting a codevector from the codebook 74, the vector quantizer 70 of the second stage 64 provides the address of the selected codevector on line 96 to the data combiner 86 for subsequent insertion into the buffer 88. As in the first stage 62, the subtractor 78 of the second stage 64 receives the selected codevector and subtracts the selected codevector from the input vector, on an element-by-element basis, to produce a residual vector (R2) for the second stage 64. Residual vector R2, of course, represents the quantization error that occurred in the second stage 64. As shown, the residual vector R2 is provided to the gating device 84 which prevents the residual vector R2 from passing to the next stage.

As in the first stage, the distortion calculator 80 of the second stage 64 determines a measure of distortion between the input vector to the second stage (i.e., residual vector R1 from the previous stage) and the codevector selected by quantizer 70 (i.e., CV2). Distortion calculator 80 of the second stage 64 may operate identically to the calculator 80 of the first stage 62. However, the calculator 80 at the second stage 62, or any other stage, may employ a different measure of distortion if desired. After determining a measure of distortion, D2, the calculator 80 provides the measure of distortion D2 to the comparator 82. Comparator 82 compares the distortion D2 to the threshold value provided on line 91. As in the first stage 62, if the distortion D2 does not exceed the threshold value, then the comparator 82 provides a signal via line 85 to the data combiner 86 indicating that the current stage (i.e., the second stage) is the last stage reached for the current data vector being processed. Gating device 84 will not allow the residual vector R2 to pass to the next stage.

If, however, the distortion D2 exceeds the threshold value, then comparator 82 provides a signal to the gating device 84 which, in response, allows the residual vector R2 to pass to the next stage. This process will continue through subsequent stages until either (1) the measure of distortion at a given stage does not exceed the threshold value, or (2) the last stage 68 is reached. If the last stage is reached, the vector quantizer 70 at that stage performs vector quantization and provides the address of the selected codevector to the data combiner 86 via line 98. On line 99, the vector quantizer 70 alerts the data combiner 86 that the last stage 68 was the last stage reached for the current data vector being processed. As shown, however, the last stage 68 does not have a subtractor, distortion calculator, comparator or gating device; no distortion calculations are performed at the last stage.

After receiving a "last stage reached" signal from one of the stages, the data combiner 86 forms a data header (not shown) that indicates that last stage reached. By indicating the "last stage reached," the data header inherently provides an indication of how many codevector addresses were generated for the current data vector. After forming the data header, the data combiner inserts the data header into the buffer followed, preferably in consecutive order, by the mean value of the data vector and the individual codevector addresses generated at each of the successive stages reached during compression of the current data vector. Another data vector may then be received at input 61 and processed in a similar manner.

Data is preferably stored in the buffer 88 on a first-in-first-out basis. At the same time, data is continuously output from the buffer 88, via line 92, at a fixed data rate for transmission to a remote VQ decoder. As described hereinafter in greater detail, the threshold adjust circuitry 90 adjusts the threshold value in accordance with a measure of the unused capacity of the buffer 88 (i.e., buffer fullness). In the present embodiment, the threshold is adjusted each time data generated for a given data vector (i.e., the data header, mean value and codevector addresses) is inserted into the buffer. Consequently, the threshold does not change during processing of a given data vector. Changing the threshold during processing of a given data vector is disadvantageous and may produce unsatisfactory results. Although threshold adjustment occurs after each data vector is compressed, periodic adjustment can occur at any interval. For example, the threshold may be adjusted only after processing a plurality of data vectors. The term "periodically" is used in the claims to cover all such possibilities.

Because the threshold is adjusted after processing each data vector, and because the characteristics of each data vector input to the encoder 60 may be different, the number of stages reached for each data vector may differ. Consequently, more data (i.e., codevector addresses) may be inserted into the buffer for some data vectors than for others. Accordingly, the present invention may be classified as a variable-rate vector quantizer; data is inserted into the buffer 88 at a variable rate. However, data is transmitted from the buffer 88 at a constant (i.e., fixed bps) rate. Fixed rate transmission is less susceptible to error than variable-rate transmission.

Figure 5:
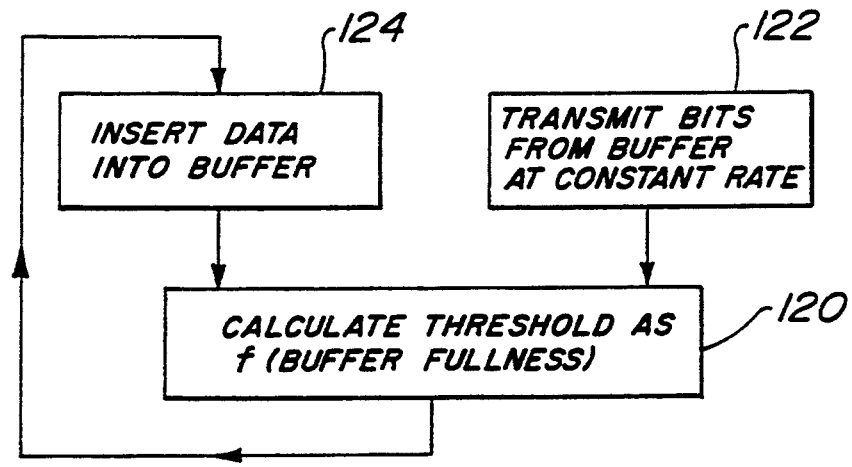
FIG. 5 is a flow chart illustrating further details of the operation of the encoder of FIG. 4.
Figure 6:
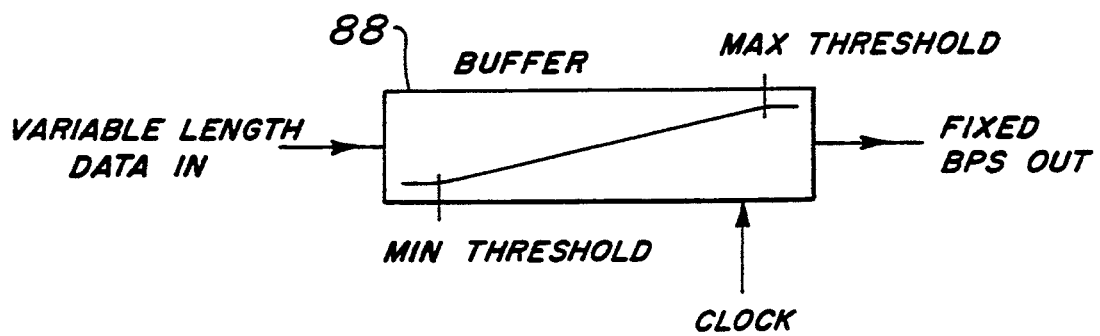
FIG. 6 is a block diagram illustrating further details of the encoder of FIG. 4.

FIG. 5 illustrates, in flowchart form, the operation of the threshold adjust circuitry 90 of FIG. 4. As data (e.g., addresses, mean values, data headers) is inserted into the buffer 88 at a variable rate (step 124), and as data is transmitted out of the buffer 88 at a fixed data rate (step 122), the threshold is periodically recalculated as a function of buffer fullness (step 120). FIG. 6 graphically illustrates the concept of employing buffer fullness to adjust the threshold value. As shown, remaining buffer capacity varies as a function of the length of the variable rate data input to the buffer (e.g., codevector addresses, data headers, etc.), since data is transmitted from the buffer 88 at a fixed data rate. As shown by the line inside buffer 88 of FIG. 6, the threshold value increases toward a maximum as unused capacity decreases, and the threshold value decreases toward a minimum as unused buffer capacity increases. Theoretical considerations for establishing minimum and maximum threshold values when image data is being compressed are:

Min threshold=0;
Max threshold=absolute value of [maxpix-minpix]* numpix; or,
Max threshold=[maxpix-minpix]$^2$* numpix;
where:
  maxpix=maximum grey level of pixels;
  minpix=minimum grey level of pixels; and
  numpix=pixels per data vector.

However, in practice, max threshold can be set to a value smaller than the theoretical maximum since the theoretical value is not likely to ever occur. This ensures better buffer utilization without requiring an excessively large buffer. Increasing the threshold value will result in the threshold value being satisfied at an earlier stage in the multi-stage VQ encoder 60, whereas decreasing the threshold value will tend to cause the process to proceed through later stages. Employing a measure of buffer fullness to generate a threshold value has been employed in other vector quantization contexts. See, for example, U.S. Pat. No. 5,172,228.

Preferably, the codebooks 72 ... 76 at each stage 62 ... 68 of the encoder 60 are tree-structured codebooks, and the vector quantizers 70 are adapted to perform vector quantization in accordance with the distortion adaptive tree search vector quantization method described in U.S. Pat. No. 5,172,228, entitled "Image Compression Method and Apparatus Employing Distortion Adaptive Tree Search Vector Quantization", which is incorporated herein by reference. However, the vector quantizers 70 at each stage 62 ... 68 are not limited to the distortion adaptive tree search method described in the '228 patent. Rather, the vector quantizers 70 at each stage may perform vector quantization in any manner. For example, a full search technique may be employed. Combining the adaptive multi-stage vector quantization technique of the present invention with the distortion adaptive tree search method of the '228 patent, however, is preferable.

Figure 7A:
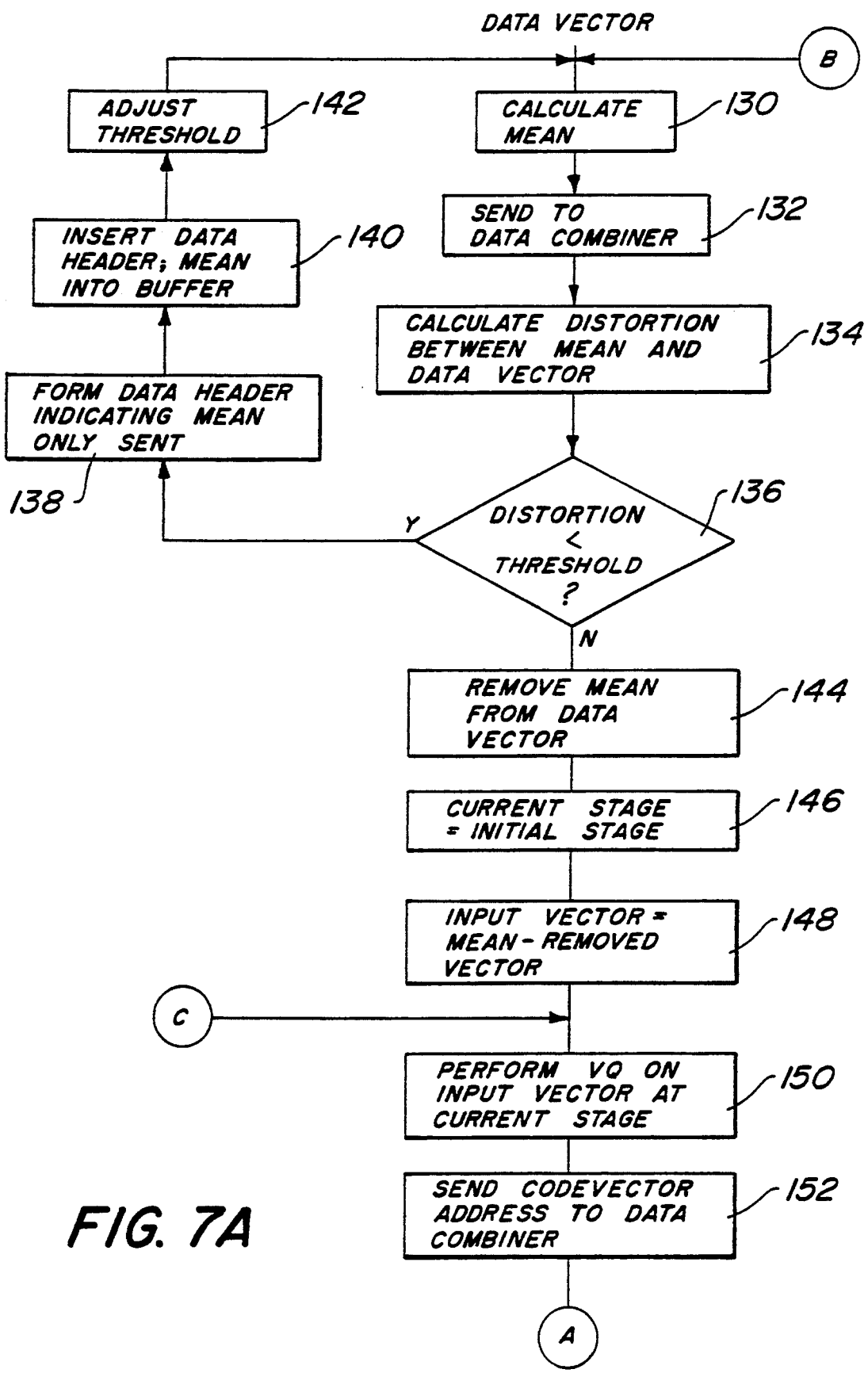
FIGS. 7A and 7B comprise a flow chart illustrating both the operation of the encoder of FIG. 4 and a preferred embodiment of the adaptive multi-stage vector quantization method of the present invention.
Figure 7B:
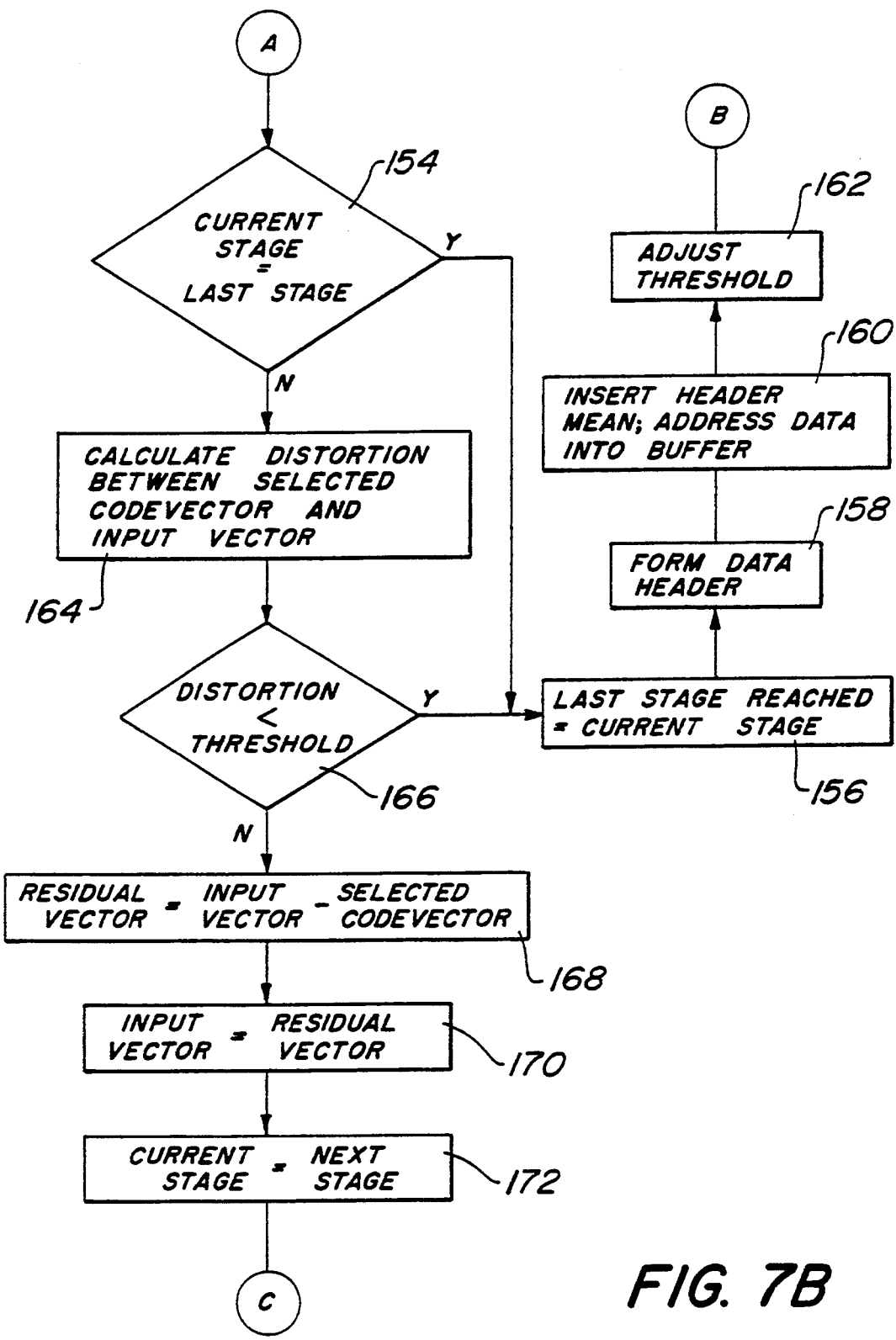

FIGS. 7A and 7B comprise a flow chart that illustrates both the operation of the encoder 60 of FIG. 4 and a preferred embodiment of the adaptive multi-stage vector quantization method of the present invention. Referring to FIG. 7A, according to the method of the present invention, a data vector is received for processing and its mean value is calculated at step 130. At step 132, the mean value of the data vector is sent to the data combiner 86. Next, at step 134, a measure of distortion between the mean value and the data vector is calculated. The measure of distortion is compared to the threshold value at step 136. If the measure of distortion is less than the threshold, then control passes to step 138 where a data header is formed indicating that only the mean value will be transmitted for the current data vector. At step 140, the data header and mean value of the data vector are inserted into the buffer 88. At step 142, the threshold value is adjusted in the manner described above. The process may then be repeated for another data vector.

If, however, the measure of distortion between the mean value and the data vector exceeds the threshold value in step 136, then control passes to step 144 where the mean value is removed from the data vector. At steps 146 and 148, a "current stage" is defined as the initial stage 62 of the encoder 60, and the meanremoved vector generated at step 144 becomes the current input vector. Next, at step 150, vector quantization is performed at the current stage (i.e., first stage 62) on the current input vector (i.e., the mean-removed vector) by comparing the input vector to the codevectors in the codebook at the current stage and selecting the codevector that most closely resembles the input vector. Next, at step 152, the codebook address of the selected codevector is sent to the data combiner 86. Control then passes to step 154 (see FIG. 7B).

At step 154, a determination is made as to whether the current stage is the last stage 68 of the encoder 60. If the current stage is not the last stage, then control passes to step 164 where a measure of distortion between the selected codevector and the input vector of the current stage is calculated. In FIG. 4, step 164 is performed by the distortion calculator 80 of the current stage. At step 166, the measure of distortion obtained in step 164 is compared to the threshold value. If the measure of distortion is less than the threshold value, then the threshold has been satisfied for the data vector being processed, and control passes to step 156 where the current stage is defined as the "last stage reached". Next, at step 158, a data header is formed that identifies the last stage reached. Note that in FIG. 4, step 166 is performed by the comparator 82 at the current stage, and step 156 involves transmitting a signal from the comparator 82 to the data combiner 86 as described above. After forming the data header at step 158, the data header, mean value, and codevector address data generated at each stage reached are inserted into the buffer 88 for subsequent transmission to a remote VQ decoder. At step 162, the threshold value is adjusted as described above.

If, however, at step 166, the measure of distortion at the current stage exceeds the threshold value, then, at step 168, the codevector selected at the current stage is subtracted from the input vector to the current stage (e.g. by subtractor 78) to generate a residual vector for the current stage. Next, at stages 170 and 172, the "current input vector" is redefined as the residual vector and the "current stage" becomes the next stage. Control then passes back to step 150 (FIG. 7A) and vector quantization is again performed at the current stage (i.e., the next stage) on the current input vector (i.e., the residual vector from the previous stage). Steps 150 through 172 are then repeated at each successive stage until either the threshold value is satisfied in step 166 or the last stage 68 of the encoder 60 is reached.

As shown in FIG. 7B, whether the last stage 68 of the encoder 60 has been reached is determined in step 154. If, at step 154, it is determined that the last stage has been reached, control passes directly to step 156. Steps 156 through 162 are then performed as described above. Note that when the last stage 68 is reached, no distortion calculations are performed (i.e., steps 164 and 166), and no residual vector is generated (i.e., step 168).

Figure 8:
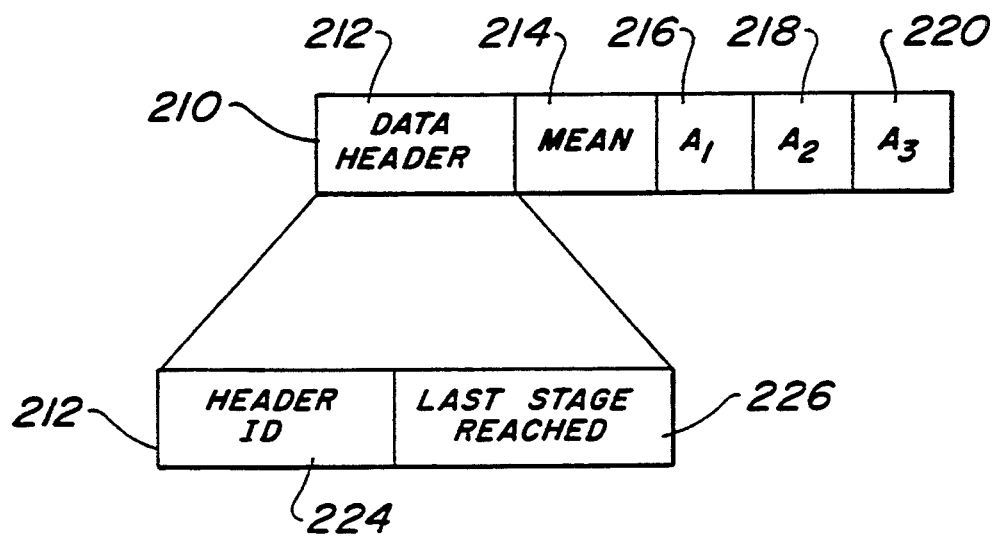
FIG. 8 graphically illustrates a set of VQ data generated for an exemplary data vector.

As described above and best illustrated in FIGS. 7A and 7B, the method of the present invention may be repeated for any number of data vectors. For example, a single image frame may be represented by a large number of individual data vectors with each data vector representing a different block of pixels in the image frame. To compress the image, each data vector will be processed in the manner illustrated in FIGS. 7A and 7B. A data header, mean value, and possibly one or more codevector addresses will therefore be transmitted for each of those data vectors. Collectively, the data header, mean value and codevector addresses transmitted for a given data vector comprise "VQ data" for that data vector. FIG. 8 graphically illustrates a set of VQ data generated for an exemplary data vector. As shown, the VQ data 210 comprises a data header 212 followed by the mean value 214 of the data vector and a plurality codevector addresses 216..220. In the example shown, three stages of the encoder 60 were reached during compression of this particular data vector. Accordingly, three codevector addresses have been generated, one by each of the three stages. As further shown, the data header 212 comprises a header ID, which may be used by a decoder to identify the data header, and a "last stage reached" field. For the example shown, the "last stage reached" field will indicate stage 3 as the last stage reached. A value of zero in the "last stage reached" field indicates that only the mean value of that particular data vector is being transmitted. As explained above, the VQ data 210 will be transmitted to a remote VQ decoder which, as explained below, will receive the transmitted data and substantially reconstruct the original data vector at that remote location.

Figure 9:
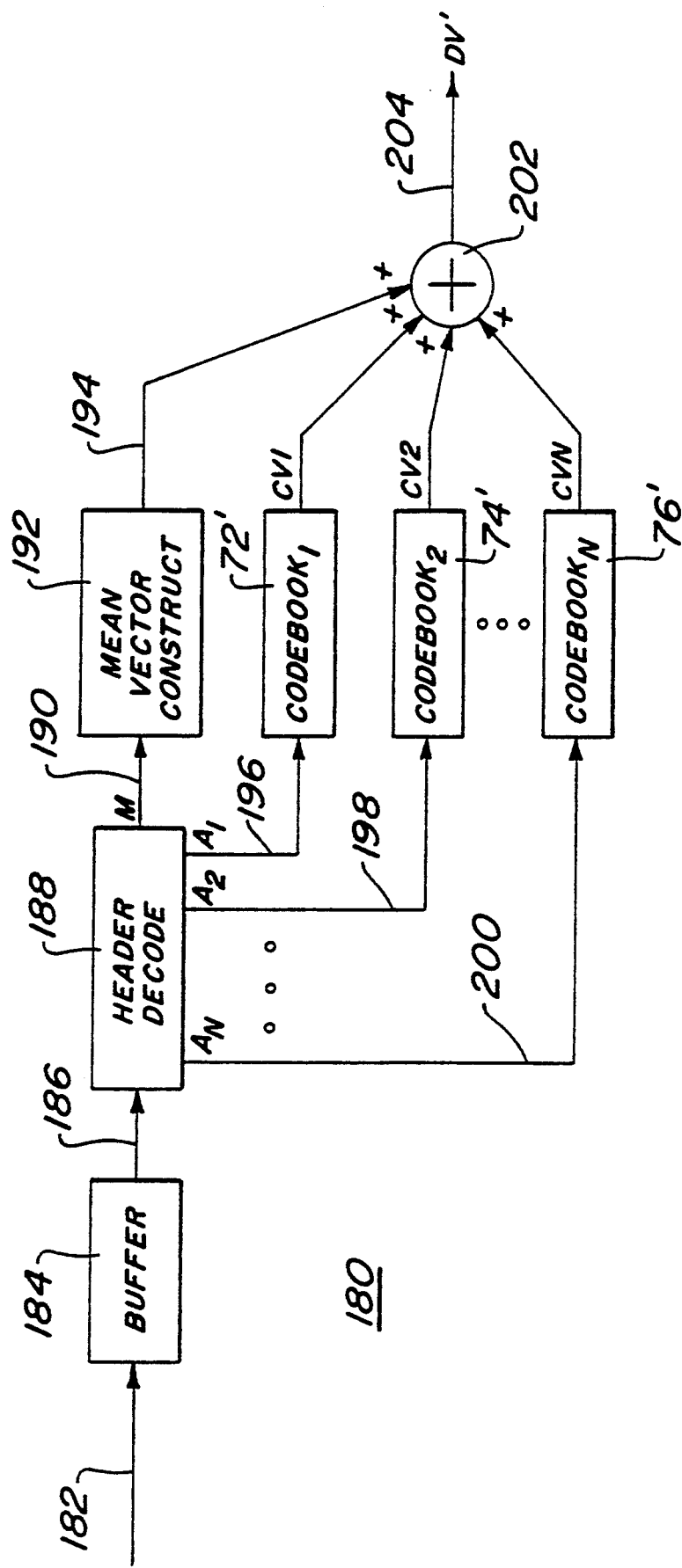
FIG. 9 is a block diagram of a preferred embodiment of a vector quantization decoder for use with the encoder of FIG. 4.

FIG. 9 is a block diagram of a preferred embodiment of a vector quantization decoder 180 for use in accordance with the encoder 60 of FIG. 4. According to the present invention, VQ data is received by the decoder 180 and provided via line 182 to a buffer 184. As mentioned above, VQ data for each data vector is transmitted and received at the decoder in the following order: data header; mean value; possibly one or more codevector addresses. Data received for each data vector is provided, in turn, to a data header decoder 188 via line 186. Decoder 188 provides the mean value via line 190 to a mean vector constructor 192. Constructor 192 generates a vector having the same dimensions as the original data vector wherein each element of the vector is equal to the mean value of the original data vector. As shown, the mean vector is provided on line 194 to a vector adder 202.

Decoder 188 next examines the received data header to determine whether any codevector addresses were transmitted for the current data vector being reconstructed. If only the mean value was transmitted, no other vector data will be added to the mean vector, and the mean vector itself will be output on line 204 as a substantial reproduction of the original data vector. If, however, the header decoder 188 determines that one or more codevector addresses were transmitted along with the mean value, then the decoder will provide those addresses on respective lines 196 ... 200 to respective codebooks 72' ... 76'. As in any multi-stage vector quantization decoder, the codebooks 72' ... 76' are identical to their respective counterparts in the VQ encoder (e.g., encoder 60 of FIG. 4). Thus, a codevector selected from the codebook at a given stage in the encoder, will be retrieved from an identical codebook at the decoder using the transmitted address. As shown in FIG. 8, codevectors retrieved from the various codebooks 72' ... 76' are provided directly to respective inputs of the vector adder 202. Adder 202 will sum the various retrieved codevectors and the mean vector and provide the result on line 204. As explained above, the codevector selected at each given stage of the encoder represents the quantization error of the previous stage. Summing the retrieved codevectors will therefore produce a substantially accurate reproduction (DV') of the original data vector (DV).

From the foregoing description, it can be seen that the present invention comprises an adaptive multi-stage vector quantization compression method and apparatus. It is understood that changes may be made to the embodiments described above without departing from the broad inventive concepts thereof. Accordingly, this invention is not limited to the particular embodiments disclosed, but is intended to cover all modifications that are within the scope and spirit of the invention as defined by the appended claims.

What is claimed is:

1. In a multi-stage vector quantization encoder comprising a plurality of consecutive vector quantization stages wherein each stage comprises a vector quantizer and an associated codebook containing a plurality of codevectors, there being a unique address associated with each codevector in the codebook of each stage, a method comprising the steps of: p1 (a) receiving a data vector indicative of a block of data to be compressed;

(b) selecting a codevector from the codebook at an initial stage that most closely resembles the data vector, generating a residual vector, and proceeding directly to step (e) if a measure of quantization error at that stage satisfies a threshold value, but otherwise first performing the following steps (c) and (d);

(c) at a next succeeding stage, selecting a codevector from the codebook at that stage that most closely resembles the residual vector from the immediately preceding stage, and generating another residual vector;

(d) repeating said step (c) until a measure of quantization error at a particular stage satisfies the threshold value; and then (e) transmitting addresses of each codevector selected in said steps (b) and (c) to a remote location.

2. A method according to claim 1 wherein the addresses are transmitted at a fixed data rate, further comprising the steps of storing said addresses to be transmitted in a buffer, periodically obtaining a measure of unused capacity of the buffer, and automatically adjusting the threshold value based upon the measure of unused buffer capacity.

3. A method according to claim 1 wherein said step (a) further comprises determining a mean value of the data vector and removing the mean value from the data vector to obtain a mean-removed vector, and wherein the mean-removed vector is employed in step (b) to select the codevector from the codebook at the initial stage.

4. A method according to claim 3 wherein said step (e) further comprises transmitting the mean value.

5. A method according to claim 3 wherein said steps (b) through (d) are only performed if a measure of distortion between the mean value and the data vector exceeds the threshold value, otherwise the process proceeds directly from said step (a) to step (e).

6. A method according to claim 1 wherein the residual vector generated in said step (b) at the initial stage is generated by subtracting the selected codevector from the data vector, and wherein the residual vector generated at each succeeding stage in said step (c) is generated by subtracting the codevector selected at that stage from the residual vector generated by the immediately preceding stage.

7. A method according to claim 1 wherein the measure of quantization error at the initial stage is defined as a measure of distortion between the codevector selected at that stage and the data vector, and wherein the measure of quantization error at each succeeding stage is defined as a measure of distortion between the codevector selected at that stage and the residual vector generated by the immediately preceding stage.

8. A method according to claim 1 wherein said step (e) further comprises constructing and transmitting a data header that specifies the number of codevector addresses being transmitted in said step (e) for a particular data vector.

9. A method according to claim 1 wherein the codebooks of each stage of the multi-stage vector quantization encoder are reproduced at the remote location, and wherein the following steps are performed at the remote location:

a') receiving each address transmitted in step (e) for said data vector;

b') for each received address, retrieving the codevector associated with that address from a respective one of the reproduced codebooks; and c') summing the retrieved codevectors to obtain a substantial reproduction of the data vector.

10. A method according to claim 4 wherein the codebooks of each stage of the multi-stage encoder are reproduced at the remote location, and wherein the following steps are performed at the remote location:
   a') receiving the mean value and each address transmitted in said step (e) for said data vector;
   b') for each received address, retrieving the codevector associated with that address from a respective one of the reproduced codebooks;
   c') summing the retrieved codevectors to obtain a substantial reproduction of the mean-removed vector; and
   d') adding the mean value to the reproduced mean-removed vector to substantially reproduce the data vector.

11. In a multi-stage vector quantization encoder comprising a plurality of consecutive vector quantization stages wherein each stage comprises a vector quantizer and an associated codebook containing a plurality of codevectors, there being a unique address associated with each codevector in the codebook of each stage, a method comprising the steps of:
   (a) receiving a data vector indicative of a block of data to be compressed;
   (b) providing the data vector to an initial stage of the multi-stage vector quantization encoder, said data vector defining an input vector for the initial stage, said initial stage defining a current stage;
   (c) selecting a codevector from the codebook at the current stage that most closely resembles the input vector and generating a residual vector based on the input vector and the selected codevector;
   (d) determining a measure of distortion between the input vector and the selected codevector;
   (e) performing the following additional steps if the measure of distortion exceeds a threshold value, but otherwise proceeding to step (f):
      (i) passing the residual vector to a next succeeding stage as an input vector to that stage, said next succeeding stage becoming the current stage; and
      (ii) repeating said steps (c) through (e) until the measure of distortion calculated in step (d) at a particular stage does not exceed the threshold value; and then,
   (f) transmitting the address of any codevectors selected in said steps (c) and (e) to a remote location, and repeating said steps (a) through (f) for a different data vector.

12. A method according to claim 11 wherein the addresses are transmitted at a fixed data rate, further comprising the steps of storing addresses to be transmitted in a buffer, periodically obtaining a measure of unused capacity of the buffer, and automatically adjusting the threshold value based upon the measure of unused buffer capacity.

13. A method according to claim 11 wherein said step (a) further comprises determining a mean value of the data vector and removing the mean value from the data vector to obtain a mean-removed vector, and wherein said step (f) further comprises transmitting the mean value, and further wherein the mean-removed vector is provided to the initial stage of the encoder as an input vector thereto in said step (b).

14. A method according to claim 13 wherein said steps (b) through (e) are only performed if a measure of distortion between the mean value and the data vector exceeds the threshold value, otherwise the process proceeds directly from said step (a) to step (f).

15. A method according to claim 11 wherein the codebook of each stage comprises a tree-structured codebook and wherein the vector quantizer of each stage performs vector quantization in accordance with a distortion adaptive tree-search vector quantization technique.

16. A method according to claim 11 wherein the codebook of each stage comprises a full-search codebook and wherein the vector quantizer of each stage performs vector quantization in accordance with a full-search technique.

17. A method according to claim 11 wherein the codevectors of the codebook at each stage are stored in a memory device and wherein each address is a memory address.

18. A method according to claim 11 wherein said step (f) further comprises constructing and transmitting a data header that specifies the last stage reached while performing said steps (c) through (e) for the data vector, said data header thereby indicating how many addresses were transmitted for the data vector.

19. A method according to claim 11 wherein the codebooks of each stage of the multi-stage vector quantization encoder are reproduced at the remote location, and wherein the following steps are performed at the remote location:
   a') receiving each address transmitted in said step (f) for a particular data vector;
   b') for each received address, retrieving the codevector associated with that address from a respective one of the reproduced codebooks; and
   c') summing the retrieved codevectors to obtain a substantial reproduction of the data vector.

20. A method according to claim 13 wherein the codebooks of each stage of the multi-stage vector quantization encoder are reproduced at the remote location, and wherein the following steps are performed at the remote location:
   a') receiving the mean value and each address transmitted in said step (f) for a particular data vector;
   b') for each received address, retrieving the codevector associated with that address from a respective one of the reproduced codebooks;
   c') summing the retrieved codevectors to obtain a substantial reproduction of the mean-removed vector; and
   d') adding the mean value to the reproduced mean-removed vector to substantially reproduce the data vector.

21. In a multi-stage vector quantization encoder comprising a plurality of consecutive vector quantization stages wherein each stage comprises a vector quantizer and associated codebook containing a plurality of codevectors, there being a unique address associated with each codevector in the codebook of each stage, a method comprising the steps of:
   (a) receiving a data vector indicative of a block of data to be compressed;
   (b) providing the data vector to an initial stage of the multi-stage vector quantization encoder, said data vector defining an input vector for the initial stage, said initial stage defining a current stage;
   (c) selecting a codevector from the codebook at the current stage that most closely resembles the input vector and generating a residual vector based on the input vector and the selected codevector;

(d) determining a measure of distortion between the input vector and the selected codevector;

(e) performing the following additional steps if the measure of distortion exceeds a threshold value, but otherwise proceeding to step (f):

(i) passing the residual vector to a next stage of the encoder as an input vector to that stage, said next stage becoming the current stage; and (ii) repeating said steps (c) through (e) until the measure of distortion calculated in step (d) at a particular stage does not exceed the threshold value; and then, (f) inserting the address of any codevectors selected in said step (c) into a buffer, and repeating said steps (a) through (f) for a different data vector; and (g) transmitting the addresses from the buffer at a fixed data rate, periodically obtaining a measure of unused capacity of the buffer, and automatically adjusting the threshold value based upon the measure of unused buffer capacity.

22. A method according to claim 21 wherein said step (a) further comprises determining a mean value of the data vector and removing the mean value from the data vector to obtain a mean-removed vector, and wherein the mean value is inserted into the buffer and transmitted therefrom in said steps (f) and (g), respectively, and further wherein the mean-removed vector is provided to the initial stage of the encoder as an input vector thereto in said step (b).

23. A method according to claim 22 wherein said steps (b) through (e) are only performed if a measure of distortion between the mean value and the data vector exceeds the threshold value, otherwise the process proceeds directly from said step (a) to step (f).

24. A method according to claim 21 wherein said step (f) further comprises inserting a data header into the buffer ahead of the addresses, said data header specifying the last stage reached while performing said steps (c) through (e).

25. A method according to claim 21 wherein the codebooks of each stage of the multi-stage vector quantization encoder are reproduced at a remote location, and wherein the following steps are performed at the remote location:

a') receiving each address transmitted in step (g) for a particular data vector;

b') for each received address, retrieving the codevector associated with that address from a respective one of the reproduced codebooks; and c') summing the retrieved codevectors to obtain a substantial reproduction of the data vector.

26. A method according to claim 22 wherein the codebooks of each stage of the multi-stage vector quantization encoder are reproduced at a remote location, and wherein the following steps are performed at the remote location:

a') receiving the mean value and each address transmitted in said step (f) for a particular data vector;

b') for each received address, retrieving the codevector associated with that address from a respective one of the reproduced codebooks;

c') summing the retrieved codevectors to obtain a substantial reproduction of the mean-removed vector; and d') adding the mean value to the reproduced mean-removed vector to substantially reproduce the data vector.

27. In a data compression system employing a multi-stage vector quantization encoder comprising a plurality of vector quantization stages coupled consecutively for compressing each of a plurality of data vectors wherein each stage has a codebook containing a plurality of codevectors and each codevector has a unique address, and wherein the number of stages through which vector quantization proceeds in the multi-stage vector quantization encoder is controlled by obtaining a measure of quantization error at each successive stage and proceeding through the successive stages only until the measure of quantization error at a particular stage satisfies a threshold value, and wherein the addresses of codevectors selected from the codebooks at each stage reached during compression of a particular data vector are transmitted to a remote location, and further wherein the codebooks of each stage of the multi-stage vector quantization encoder are reproduced at the remote location, a method for substantially reproducing the data vector at the remote location comprising the steps of:

a') receiving the codevector addresses transmitted by the multi-stage vector quantization encoder for that data vector;

b') for each received address, retrieving the codevector associated with that address from a respective one of the codebooks at the remote location; and c') summing the retrieved codevectors to obtain a substantial reproduction of the data vector.

28. A method according to claim 27 wherein, prior to said vector quantization in the multi-stage vector quantization encoder, the mean value of the data vector was removed therefrom and transmitted to the remote location along with the codevector addresses, said method further comprising the steps of receiving the mean value and adding the mean value back to the data vector reproduced in step (c').

29. In a data compression system employing a multi-stage vector quantization encoder comprising a plurality of vector quantization stages coupled consecutively for compressing each of a plurality of data vectors wherein each stage has a codebook containing a plurality of codevectors and each codevector has a unique address, and wherein the number of stages through which vector quantization proceeds in the multi-stage vector quantization encoder is controlled by obtaining a measure of quantization error at each successive stage and proceeding through the successive stages only until the measure of quantization error at a particular stage satisfies a threshold value, and wherein the addresses of codevectors selected from the codebooks at each stage reached during compression of a particular data vector are transmitted to a remote location, and further wherein the codebooks of each stage of the multi-stage vector quantization encoder are reproduced at the remote location, a method for substantially reproducing the data vector at the remote location comprising the steps of:

a') receiving the codevector addresses transmitted by the multi-stage vector quantization encoder for that data vector;

b') for each received address, retrieving the codevector associated with that address from a respective one of the codebooks at the remote location; and c') summing the retrieved codevectors to obtain a substantial reproduction of the data vector.

30. A multi-stage vector quantization encoder comprising:

a plurality N of vector quantization stages arranged consecutively and each having a vector input, a residual vector output and a codevector address output, the residual vector output of each stage being coupled to the vector input of a succeeding stage, the vector input of an initial stage being coupled to receive a data vector indicative of a block of data to be compressed, each stage comprising:

a vector quantizer having an associated codebook containing a plurality of codevectors, each codevector having an address associated therewith, said vector quantizer performing vector quantization on an input vector to said stage;

a vector subtractor coupled to said vector quantizer for generating a residual vector based on a codevector selected by the vector quantizer and the input vector;

a distortion calculator for determining a measure of distortion between the input vector and the selected codevector;

a comparator for comparing the measure of distortion to a threshold value; and a gating device responsive to the comparator for allowing the residual vector to pass from the residual vector output of the stage to the vector input of a next succeeding stage only when the measure of distortion exceeds the threshold value, said encoder further comprising a transmitter for transmitting the addresses of codevectors selected at each stage to a remote location.

31. An encoder according to claim 30 further comprising:

a data buffer for temporarily storing the addresses of selected codevectors prior to transmission; and a threshold calculator coupled to the buffer and to each stage for providing each stage with the threshold value and for periodically adjusting the threshold value based upon a measure of the unused capacity of the buffer.

32. An encoder according to claim 31 wherein the transmitter transmits data from the buffer at a fixed data rate.

33. An encoder according to claim 30 wherein a last stage comprises only a vector quantizer and a codebook.

34. An encoder according to claim 30 further comprising a mean value calculator coupled to the initial stage for determining a mean value of the data vector and for removing the mean value from the data vector to produce a mean-removed vector, said initial stage receiving the mean-removed vector.

35. An encoder according to claim 34 further comprising means for obtaining a measure of distortion between the mean value and the data vector and for allowing the initial stage to receive the mean-removed vector only if the measure of distortion between the mean value and the data vector exceeds the threshold value.

36. An encoder according to claim 30 further comprising means coupled to each stage for generating a data header that identifies, for a particular data vector, a last stage reached during compression of that data vector, said data header being transmitted along with the codevector addresses, if any, generated for that data vector.

37. An encoder according to claim 30 wherein the codebook of each stage comprises a tree-structured codebook and wherein the vector quantizer of each stage performs vector quantization in accordance with a distortion adaptive tree-search vector quantization technique.

38. An encoder according to claim 30 wherein the codebook at each stage comprises a full-search codebook and wherein the vector quantizer of each stage performs vector quantization in accordance with a full-search technique.

39. A vector quantization decoder for use at a remote location in conjunction with the encoder of claim 30, said vector quantization decoder comprising:

a plurality of codevector codebooks, each codebook being identical to the codebook of a respective one of the stages of said encoder;

a receiver for receiving each of the codevector addresses transmitted by the encoder for a particular data vector;

means for employing each received codevector address to retrieve the codevector associated with that address from a respective one of the codebooks; and an adder for summing the retrieved codevectors to obtain a substantial reproduction of the data vector.

40. A decoder according to claim 39 wherein the receiver is further operative to receive a data header transmitted by the encoder along with the codevector addresses, wherein said data header specifies the number of codevector addresses transmitted for a given data vector, said vector quantization decoder further comprising a header decoder for processing the data header to determine the number of codevector addresses to be received for the data vector.

* * * * *